United States Patent
Kahlig

(10) Patent No.: US 10,633,041 B2
(45) Date of Patent: *Apr. 28, 2020

(54) ENDLESS TRACK ASSEMBLY FOR SUPPORTING AN IMPLEMENT OR VEHICLE

(71) Applicant: J&M Manufacturing Co., Inc., Ft. Recovery, OH (US)

(72) Inventor: Sean M. Kahlig, Fort Recovery, OH (US)

(73) Assignee: J&M Manufacturing Co., Inc., Ft. Recovery, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/190,731

(22) Filed: Nov. 14, 2018

(65) Prior Publication Data

US 2019/0077473 A1 Mar. 14, 2019

Related U.S. Application Data

(63) Continuation of application No. 15/341,299, filed on Nov. 2, 2016, now Pat. No. 10,137,949.

(51) Int. Cl.
*B62D 55/108* (2006.01)
*B62D 55/15* (2006.01)

(52) U.S. Cl.
CPC ......... *B62D 55/1086* (2013.01); *B62D 55/15* (2013.01)

(58) Field of Classification Search
CPC ... B62D 55/108; B62D 55/1086; B62D 55/15
See application file for complete search history.

(56) References Cited

U.S. PATENT DOCUMENTS

| | | | |
|---|---|---|---|
| 1,275,343 | A | 8/1918 | White |
| 2,487,134 | A | 11/1949 | Herold |
| 4,519,654 | A | 5/1985 | Satzler et al. |
| 5,452,949 | A | 9/1995 | Kelderman |
| 5,503,238 | A | 4/1996 | Urbanek et al. |
| 5,899,542 | A | 5/1999 | Lykken et al. |
| 5,899,543 | A | 5/1999 | Lykken et al. |
| 7,380,892 | B2 | 6/2008 | Rosenboom |
| 7,726,749 | B2 | 6/2010 | Rosenboom |
| 9,440,691 | B2 | 9/2016 | Rosenboom |
| 10,137,949 | B2 * | 11/2018 | Kahlig ............... B62D 55/1086 |
| 2004/0056531 | A1 | 3/2004 | Tamaru |
| 2012/0169113 | A1 | 7/2012 | La Spina |
| 2012/0242142 | A1 | 9/2012 | Kautsch et al. |

* cited by examiner

*Primary Examiner* — Kip T Kotter
(74) *Attorney, Agent, or Firm* — Wood Herron & Evans LLP

(57) ABSTRACT

A track assembly includes an elongated main frame supported for pivotal movement on a transverse axis and having opposite end portions supporting a set of end wheels. An endless flexible belt extends around the end wheels and has an upper run and a lower run for engaging the ground. A plurality of longitudinally spaced bogie wheels are positioned below the main frame and engage the lower run of the belt. The bogie wheels are carried by bogie frames supported for vertical movement and also for tilting movement relative to a plane defined by the axes of the end wheels. The bogie frames are urged or biased downwardly against the lower run of the belt by compression members extending from the main frame and preferably in the form of annular rubber spring members.

12 Claims, 6 Drawing Sheets

US 10,633,041 B2

ENDLESS TRACK ASSEMBLY FOR SUPPORTING AN IMPLEMENT OR VEHICLE

CROSS-REFERENCE TO RELATED APPLICATION

This application is a continuing application of U.S. application Ser. No. 15/341,299, filed Nov. 2, 2016 (now U.S. Pat. No. 10,137,949, issued Nov. 27, 2018), the disclosure of which is hereby incorporated by reference in its entirety.

BACKGROUND OF THE INVENTION

This invention relates to an endless track assembly for supporting an implement or vehicle, such as, for example, of the general type disclosed in U.S. Pat. Nos. 7,380,892, 7,726,749 and 9,440,691. In such a track assembly, it is desirable for the track assembly to accommodate uneven loading across the track assembly wheels, including the end wheels for the endless track or belt and the smaller bogie wheels which engage the bottom or lower run of the endless track or belt. It is also desirable to provide more uniform ground contact over uneven terrain in order to minimize stresses and vibrations in both the track assembly components and in the implement or vehicle supported by the track assembly. The decrease in stresses and vibration in an implement being supported by the track assembly also reduces any discomfort to the driver of a tractor or vehicle that is pulling the implement supported by the endless track assembly.

SUMMARY OF THE INVENTION

The present invention is directed to an improved endless track assembly which provides the above advantages by using a floating suspension for the bogie wheels which are biased downwardly so that the wheels more closely follow the contour of the ground or uneven terrain. This is provided by downward compression on the bogie wheels along with pivoting or tilting movement of the wheels in both longitudinal and transverse planes on longitudinal and laterally extending axes. As a result of the floating and tilting bogie wheels with vertical and pivotal movement, the endless track follows the contour of the terrain more closely and thereby reduces ground pressure and soil compaction. The suspended floating support of the bogie wheels also distributes the combined weight of the track assembly and the supporting implement or equipment more uniformly over the ground contact area of the endless track or belt and further extends the service life of the endless track and the implement or equipment.

Other features and advantages of the invention will be apparent from the following description, the accompanying drawings and the appended claims.

DESCRIPTION OF THE ILLUSTRATED EMBODIMENT

Figure 1:
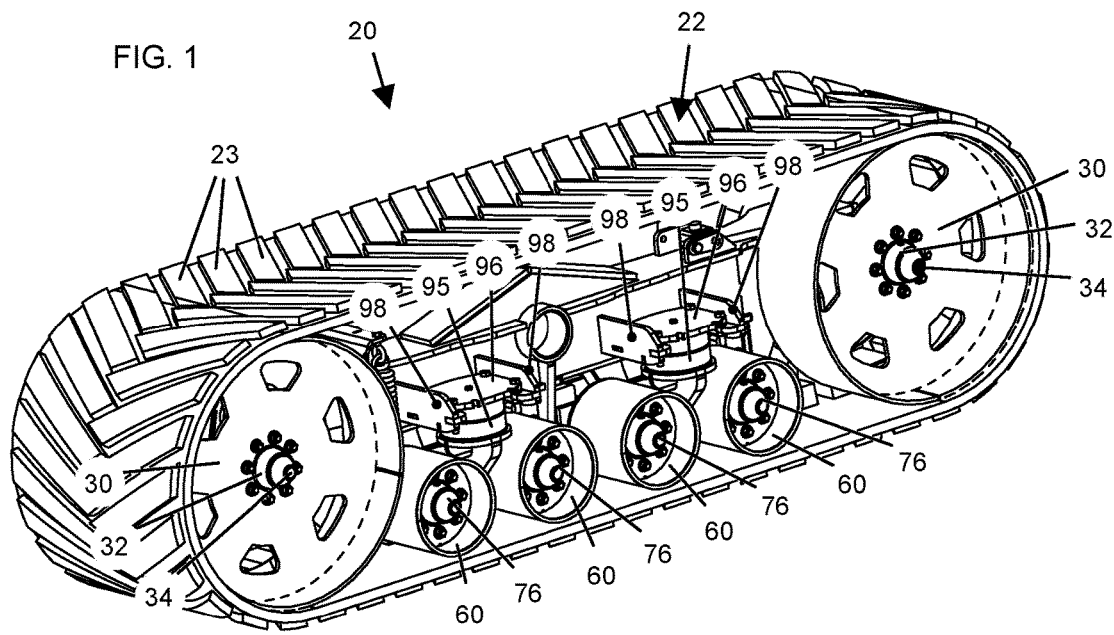
FIG. 1 is a perspective or isometric view of an endless track assembly constructed in accordance with the invention and which provides the above features and advantages.
Figure 2:
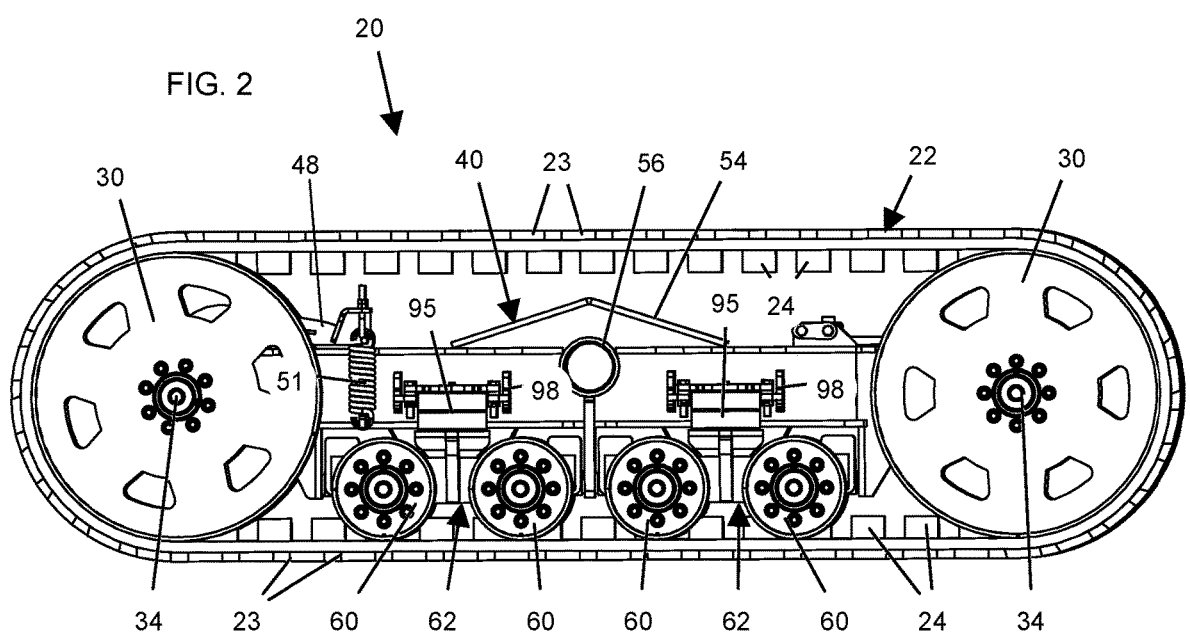
FIG. 2 is an elevational side view of the track assembly shown in FIG. 1.
Figure 3:
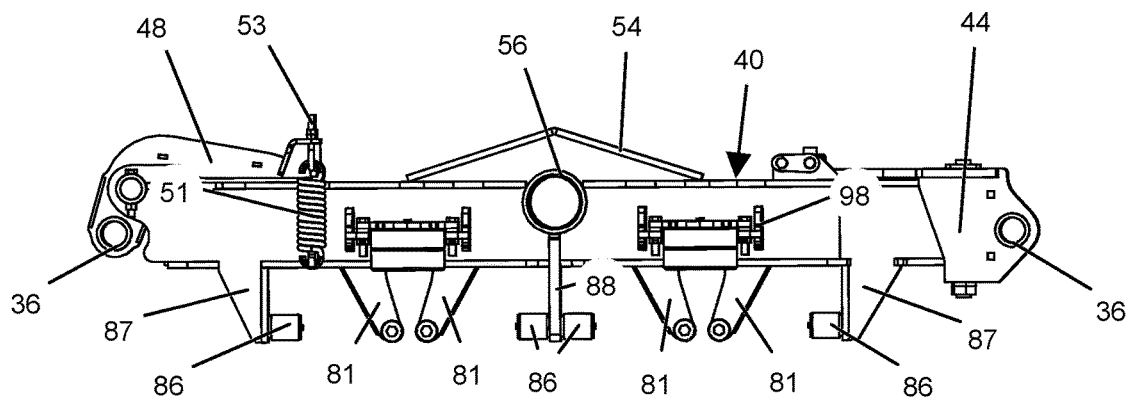
FIG. 3 is an elevational view of the center frame assembly used in the track assembly shown in FIGS. 1 & 2.

FIG. 1 illustrates an elongated endless track assembly 20 which includes an endless flexible rubber molded belt 22, preferably of the type produced by Camso, Inc. in Emporia, Kans. The belt has an exterior surface formed by a herringbone pattern of laterally extending integral rubber lugs 23. The inner surface of the belt 22 has longitudinally spaced integral projections or lugs 24 (FIG. 2) in the center portion of the belt. The endless belt 22 extends around a pair of end wheels 30 at each end, and the wheels have hubs 32 secured by bolts to wheel bearings mounted on opposite ends of corresponding axles 34. The axles extend through tubes 36 (FIG. 3) supported by opposite end portions of an elongated fabricated steel frame 40 (FIG. 3). The end wheels 30 on each axle 34 are spaced axially on the axle to define a space which receives the lugs 24 on the belt 22 to maintain alignment of the belt on the wheels.

One end portion of the frame 40 supports a bracket 44 (FIG. 3) which carries the tube 36 for the front axle 34, and the bracket 44 is adjustable longitudinally on the frame 40 for accommodating any stretch in the endless belt 22. The opposite or rearward end portion of the frame 40 supports a pivotal lever 48 (FIG. 3) which supports the tube 36 for the rear axle 34. The forward end portion of the lever 48 is connected to the frame 40 by a tension spring 51 and an adjustable nut on an eye bolt 53 for selecting and maintaining the desired tension in the endless belt 22. The center portion of the frame 40 has a reinforcing brace 54 and supports a cross tube 56 which receives a cross-shaft (not shown) secured to the frame of the implement or equipment supported by the track assembly 20. The tube 56 provides for pivoting of the track assembly 20 on a transverse or laterally extending axis.

Figure 4:
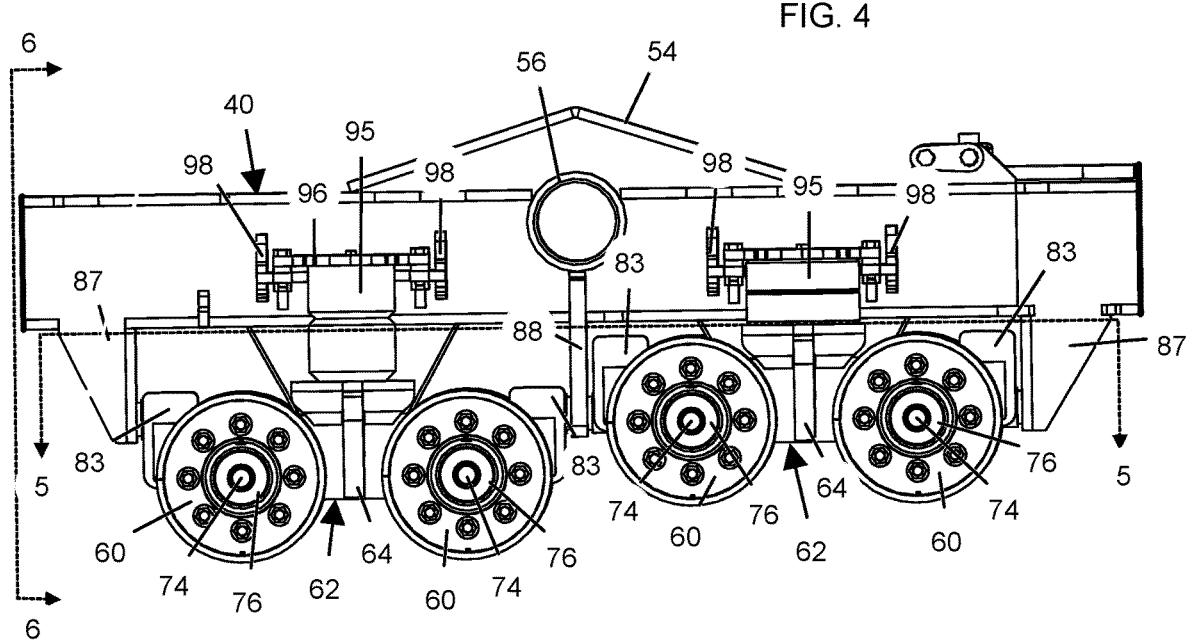
FIG. 4 is a fragmentary view of the frame assembly with one set of suspended and floating bogie wheels in its upper retracted position and another set of bogie wheels in its lower position.
Figure 5:
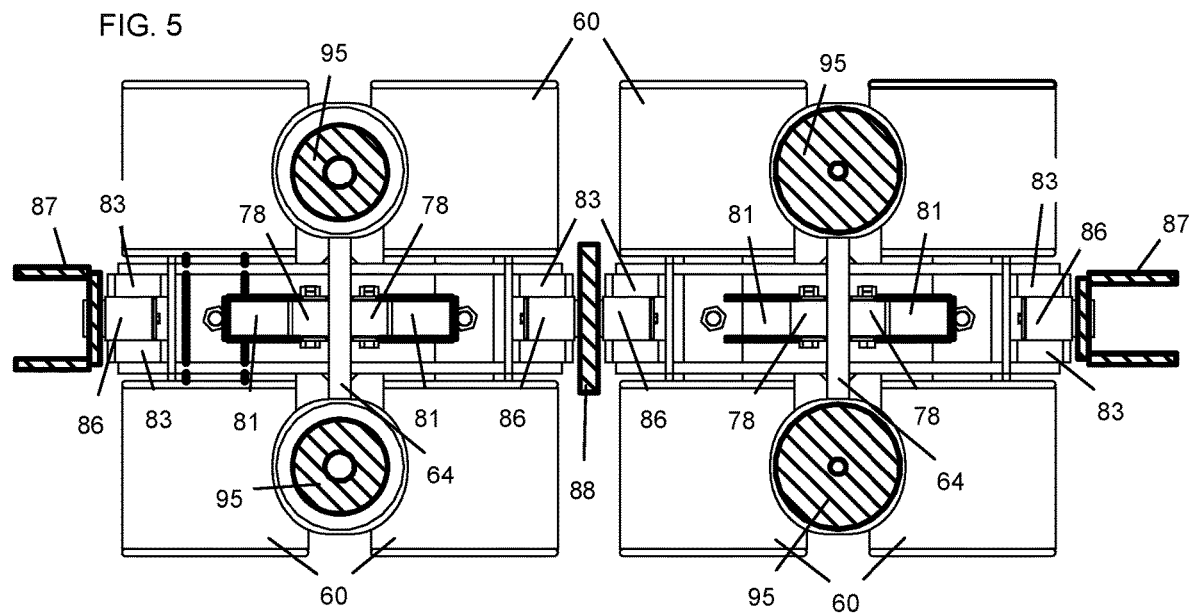
FIG. 5 is a horizontal section of the frame assembly and suspended bogie wheels, taken generally on the line 5-5 of FIG. 4.
Figure 6:
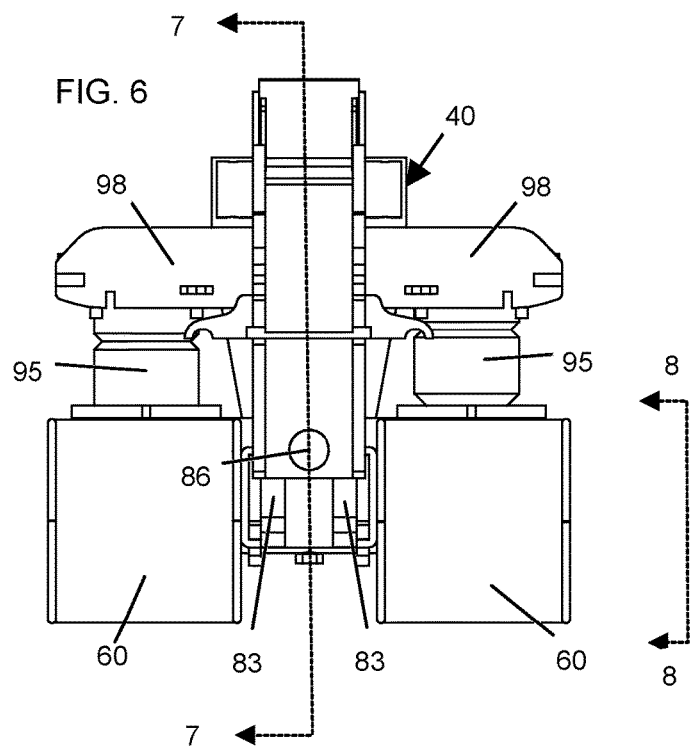
FIG. 6 is a vertical section of the frame assembly and bogie wheels, taken generally on the line 6-6 of FIG. 4.
Figure 7:
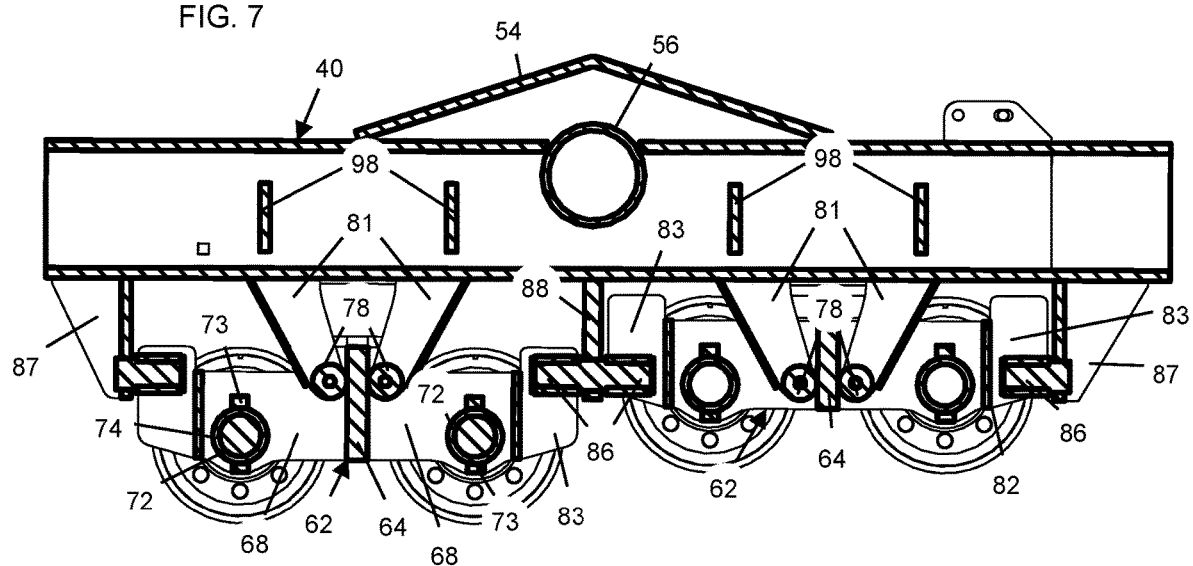
FIG. 7 is a vertical section of the frame assembly and suspended bogie wheels, taken generally on the line 7-7 of FIG. 6.
Figure 8:
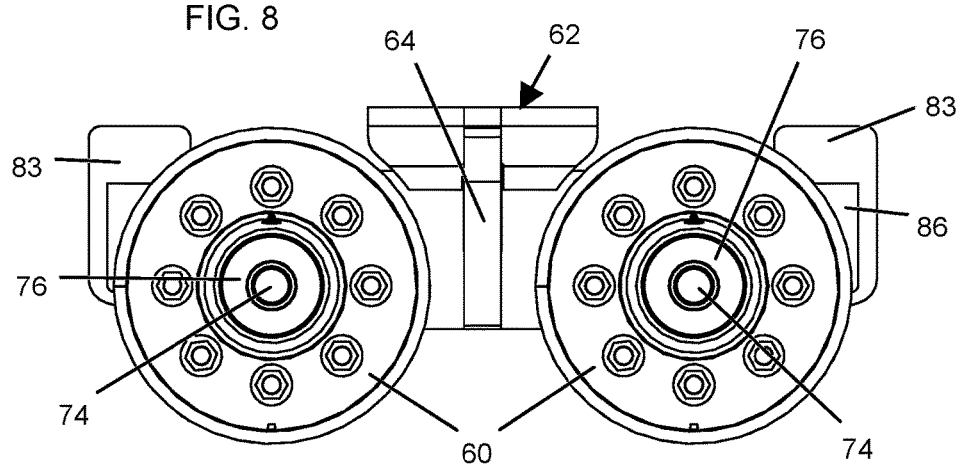
FIG. 8 is a side elevational view of a set of bogie wheels, taken generally on the line 8-8 of FIG. 6.
Figure 9:
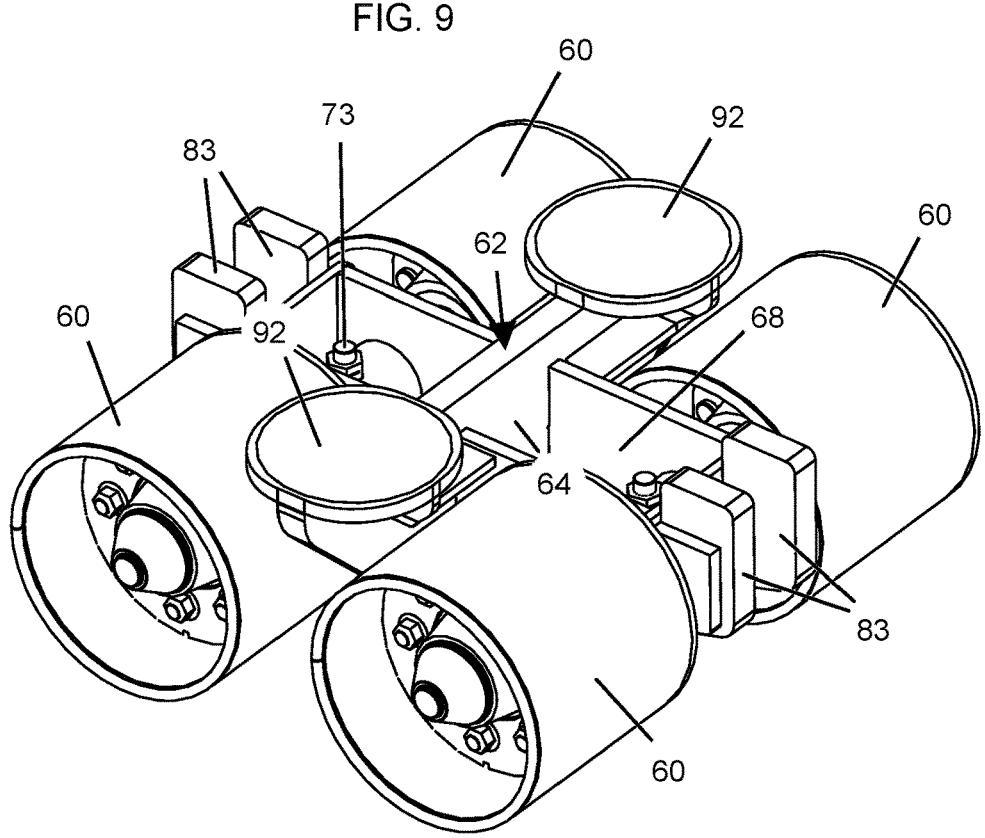
FIG. 9 is an isometric view of an assembly or set of four bogie wheels.
Figure 10:
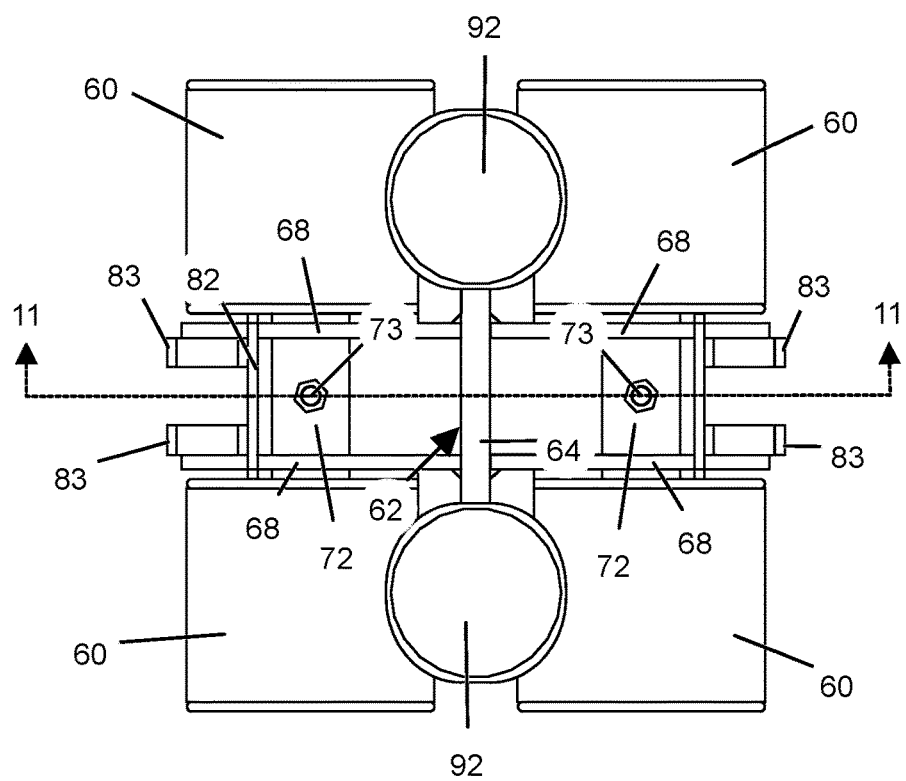
FIG. 10 is a plan view of the assembly of the four bogie wheels shown in FIG. 9.
Figure 11:
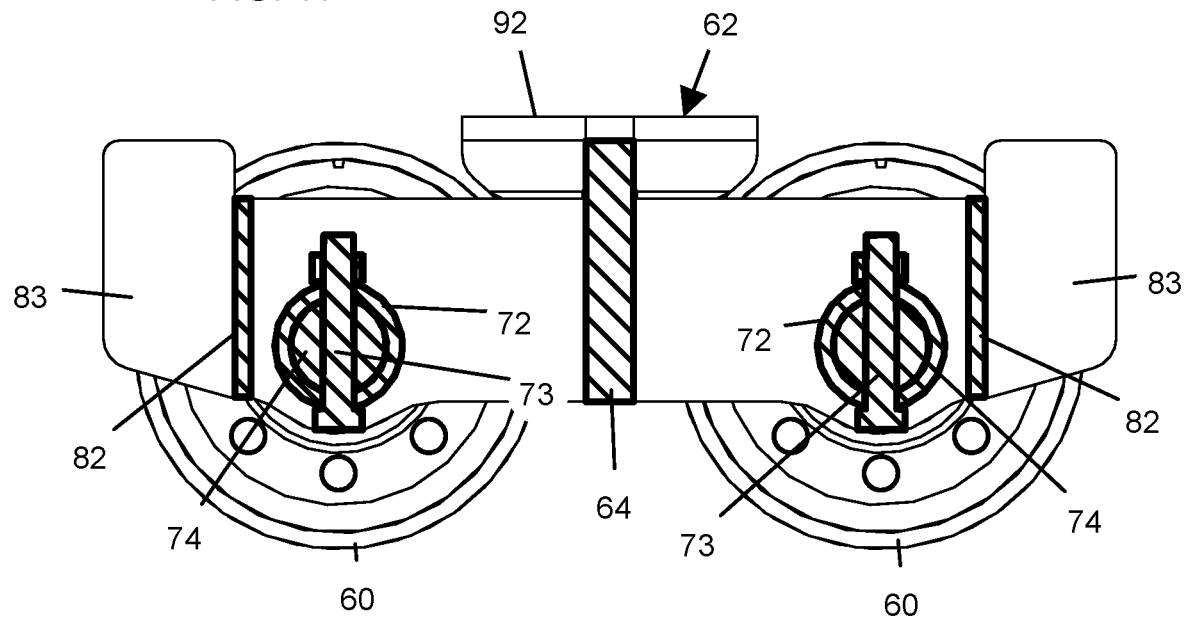
FIG. 11 is a vertical section of the bogie wheel assembly, taken generally on the line 11-11 of FIG. 10.
Figure 12:
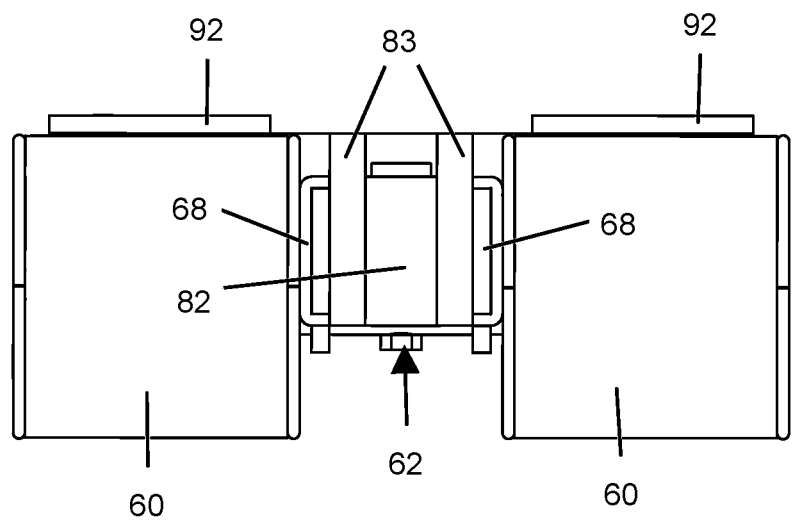
FIG. 12 is an end view of the bogie wheel assembly shown in FIG. 10.

Referring to FIGS. 4-12 and in accordance with the present invention, a forward set of four bogie wheels 60 and a rearward set of four bogie wheels 60 are supported below the frame 40 in suspended floating relation and float vertically between an upper position as shown by the forward set of bogie wheels in FIG. 4 and a lower position as shown by the rearward set of bogie wheels in FIG. 4. As shown in FIG. 2, all of the bogie wheels 60 are substantially smaller than the end wheels 30 and are normally biased to their lower positions where the bogie wheels engage the inner surface of the bottom run of the belt 22 outboard of the lugs 24.

Each set of front bogie wheels 60 and rear bogie wheels 60 is supported for independent vertical and tilting movement relative to the frame 40 by a support frame 62 (FIG. 7) including a vertical guide plate 64. The plate 64 is rigidly connected to longitudinally extending and parallel spaced plates 68 (FIG. 7) located adjacent the inner sides of each set of four bogie wheels. The plates 68 are also connected by a pair of tubes 72 secured by bolts 73 to a pair of axles 74 having outer end portions which receive the bearings and hubs 76 (FIG. 8) for the set of four bogie wheels 60.

Each of the vertical support plates 64 for each set of four bogie wheels 60 is guided for vertical and tilting movement in a vertical longitudinal plane between a pair of rollers 78 (FIG. 5) supported by inclined brackets 81 (FIG. 7) secured to the frame 40. The longitudinally extending parallel plates 68 projecting from each vertical plate 64 have end portions connected by plates 82 (FIG. 10) and support parallel spaced opposing guide plates 83 that receive therebetween a roller bearing 86 (FIG. 7) supported by an end bracket 87 and a center vertical plate 88 for guiding the support frame 62 for each set of four bogie wheels for both vertical and tilting movement both in a vertical longitudinal plane and a vertical lateral or transverse plane.

Referring to FIGS. 9-12, the vertical guide plate 64 of the frame 62 which supports each set of four bogie wheels 60, also supports a pair of circular base plates 92. Each base plate receives a bottom plate of a resilient compression member 95 (FIG. 4), preferably in the form of a hollow rubber spring member such as produced by Timbren Industries Inc. of Whitby, Ontario, Canada. A top plate 96 (FIGS. 1 & 4) of each compression member 95 is connected by bolts to a pair of opposing L-shaped brackets 98 (FIGS. 1 & 4) having inner ends welded to the main center frame 40.

As apparent from the above construction of the track assembly 20, each set of four suspended bogie wheels 60 is free to float up and down and tilt in both longitudinal and lateral vertical planes against the downward pressure or bias produced by the rubber compression members or springs 95. That is, the support of the longitudinal center frame 40 of the track assembly 20 by the cross tube 56 permits the entire track assembly 20 to pivot or tilt in a longitudinal vertical plane on a transverse axis.

The rollers 78 contacting the vertical guide plate 64 and the rollers 86 contacting the guide plates 83 permit each bogie support frame 62 and the corresponding set of four bogie wheels 60 to move or float up and down and also tilt forwardly and rearwardly in a longitudinal vertical plane. In addition, the rollers 86 between the vertical guide plates 83 cooperate with the rollers 78 and guide plate 64 to permit each bogie support frame 68 and the corresponding set of four bogie wheels 60 to tilt laterally in a transverse vertical plane in both directions. As a result, the lower run of the endless belt 22 engages and follows the contour of the ground with more uniform pressure and thereby provide all of the advantages mentioned above in the Summary of the Invention.

In addition, when the track assembly 20 is supporting a lighter load, such as an empty grain cart, the bogie wheels 60 press a portion of the lower run of the belt 22 under the bogie wheels downwardly below the portions of the belt contacting the end wheels 30 so that the bogie wheels 60 carry all of the load. As a result, the raised end wheels 30 allow the belt to slope upwardly to the end wheels so that the belt more easily climbs over uneven terrain. The less belt contacting the ground for a lighter load also reduces the force required to turn the track assembly 20 and reduces tread wear of the belt 22.

While the form of track assembly herein described constitutes a preferred embodiment of the invention, it is to be understood that the invention is not limited to this precise form of assembly, and that changes may be made therein without departing from the scope of the invention as defined in the appended claims.

What is claimed is:

1. A track assembly adapted to support an implement or vehicle and for accommodating uneven ground by improved contact with the ground, comprising:
   an elongated main frame supported for tilting movement on an axis transverse to the main frame,
   the main frame having opposite end portions supporting a set of end wheels for rotation on parallel transverse axes,
   an endless flexible belt extending around the set of end wheels and having an upper run and a lower run for engaging the ground,
   a plurality of bogie wheels each having a transverse axis positioned below a plane defined by the axes of the end wheels, with the bogie wheels engaging the lower run of the endless belt,
   a bogie frame supporting the bogie wheels on opposite sides of the main frame,
   a set of rollers having horizontal axes and supported by the main frame providing for vertical movement and tilting movement of the bogie frame and the bogie wheels, and
   a plurality of compression members positioned to bias the bogie frame and the bogie wheels downwardly and for floating movement against the lower run of the endless belt.

2. The track assembly of claim 1 further comprising a pair of guides located at each end of the bogie frame, and one of the rollers having a horizontal axis is supported by the main frame between each pair of the guides.

3. The track assembly of claim 1 and including a second plurality of bogie wheels supported on opposite sides of the main frame by a second bogie frame spaced longitudinally from the first bogie frame, the second bogie frame being supported for vertical movement and tilting movement, and compression members positioned to bias the second bogie frame downwardly for the vertical and tilting movement independent of the first bogie frame.

4. The track assembly of claim 3 wherein the first bogie frame and the second bogie frame are located adjacent opposite end portions of the main frame.

5. The track assembly of claim 3 further comprising a vertical plate supported by the main frame between the first bogie frame and the second bogie frame, and the vertical plate supporting one of the rollers for rotation on a horizontal axis between the pair of guides on a bogie frame to provide for the vertical and tilting movement of the bogie frame.

6. The track assembly of claim 1 wherein the compression members are effective to bias the bogie wheels and a portion of the lower run of the endless belt downwardly under lighter loads for reducing the force required to turn the track assembly.

7. The track assembly of claim 1 wherein the compression members comprise annular rubber compression members.

8. A track assembly adapted to support an implement or vehicle and for accommodating uneven ground by improved contact with the ground, comprising:

an elongated main frame supported for tilting movement on an axis transverse to the main frame, the main frame having opposite end portions supporting a set of end wheels for rotation on parallel transverse axes, an endless flexible belt extending around the set of end wheels and having an upper run and a lower run for engaging the ground, a plurality of bogie wheels each having a transverse axis and positioned below a plane defined by the axes the end wheels, with the bogie wheels engaging the lower run of the endless belt, a set of longitudinally spaced bogie frames each supporting a set of the bogie wheels on opposite sides of the main frame, a set of rollers having horizontal axes and supported by the main frame providing for vertical movement and tilting movement of the bogie frames and the bogie wheels, and a plurality of compression members positioned to bias the bogie frames and the bogie wheels downwardly for floating movement against the lower run of the endless belt.

9. The track assembly of claim 8 further comprising a guide supported by the main frame between the first bogie frame and the second bogie frame.

10. The track assembly of claim 8 wherein the compression members are effective to bias the bogie wheels and a portion of the lower run of the endless belt downwardly under lighter loads on the track assembly for reducing the force required to turn the track assembly.

11. The track assembly of claim 8 wherein the compression members comprise annular rubber spring compression members.

12. The track assembly of claim 8 wherein each bogie frame includes a set of horizontally spaced vertical guides at each end of the bogie frame, and one of the rollers having a horizontal axis being supported by the main frame between each set of vertical guides.

\* \* \* \* \*